United States Patent [19]

Griebeler

[11] Patent Number: 4,459,526
[45] Date of Patent: Jul. 10, 1984

[54] MULTI APERTURED LENS SHOCK WAVE PROBE

[76] Inventor: Elmer L. Griebeler, 5111 W. Doherty Rd., West Bloomfield, Mich. 48033

[21] Appl. No.: 335,331

[22] Filed: Dec. 29, 1981

Related U.S. Application Data

[63] Continuation-in-part of Ser. No. 155,944, Jun. 3, 1980, Pat. No. 4,326,155.

[51] Int. Cl.³ .............................................. G05B 19/36
[52] U.S. Cl. ................................... 318/576; 318/645; 73/587; 367/906
[58] Field of Search ............... 318/645, 640, 576, 577, 318/638; 367/127, 160, 906; 73/587, 597, 602, 620

[56] References Cited

U.S. PATENT DOCUMENTS

| | | | |
|---|---|---|---|
| 2,434,143 | 1/1948 | Chilowsky | 367/160 |
| 2,743,429 | 4/1956 | Erdman et al. | 367/127 |
| 3,497,731 | 2/1970 | Straube | 367/160 |
| 3,775,582 | 11/1973 | Iceland | 318/640 |
| 3,821,469 | 6/1974 | Whetstone et al. | 367/906 |
| 3,893,342 | 7/1975 | Florian et al. | 73/517 R |
| 4,012,588 | 3/1977 | Davis et al. | 367/127 |
| 4,326,155 | 4/1982 | Griebler | 318/576 |

Primary Examiner—B. Dobeck
Attorney, Agent, or Firm—Patrick H. Hume

[57] ABSTRACT

There is disclosed a system for guiding, positioning, and measuring through robot control, a tool and a work zone relative to each other, by a noncontacting probe of at least one transceiver for generating shock waves, and for sensing their reflections, with one or more multiple apertured lenses for focusing and concentrating such shock waves and their reflections.

50 Claims, 14 Drawing Figures

MULTI APERTURED LENS SHOCK WAVE PROBE

This application is a continuation-in-part of my co-pending application, Ser. No. 155,944, filed June 3, 1980, for SHOCKWAVE PROBE, now U.S. Pat. No. 4,326,155 issued Apr. 20, 1982.

BACKGROUND OF THE INVENTION

1. Field of Invention

The present invention relates to probes and sensory guides for robot actuated tools, such as grippers, welding heads, positioning, measuring and counting devices, etc., that perform a control function without physically contacting the work piece being sensed.

2. Description of the Prior Art

Systems are well known wherein sensing devices locate a work piece or zone (work), and effect relative positioning between the work and a tool for performing an operation thereon, by comparative intelligence that is translated into a control function by which optimum relative positioning is sought to be achieved and maintained. Probes that physically contact the work and follow its contours to cause a tool to track through mechanical (including hydraulic and pneumatic) and electrical (including magnetic and electronic) linkages, are distinguished from contactless probes of present concern. The Zeewy et al. U.S. Pat. No. 3,883,956, exemplifies such physical probes as applied to a welding operation. A downwardly-biased finger probes the groove or joint to be welded. During relative movement between finger and groove, variations in the latter cause the finger to move, which produces voltages that are translated into movement of the responding welding torch in a duplicate pattern that, ideally, tracks the groove being welded. Such systems are marked by significant disadvantages: finger probes deteriorate due to weld spatter, and intense heat, consequent upon proximity to the welding zone; and in non-welding applications due to frictional wear, and can get in the way of the tool. More remote spacing greatly increases the complexity and cost of such systems when designed to offset the aggravated geometric problems. Good practice dictates that the probe be positioned as closely as possible to the tool, in a lead or advance location to the tool in order to minimize tracking errors without deleterious exposure to itself, or interference with the tool in performing the work to be done. Contactless probes which can be positioned well above the work commend themselves as best suited to achieve these ends.

Several forms of contactless probes are known to the prior art. Among these is the optical approach disclosed by Stanley, U.S. Pat. No. 3,009,049, employing a television monitor in a welding operation, which is subject to disadvantages of damage to the optical system from heat and spatter, as well as aberrations arising from flickering of the welding arc, glowing of the molten metal, and obscuration by flux in the seam ahead of the torch. Also such systems tend to be very complex, expensive, and intolerably slow in converting the television image into a position error signal, even in non-welding applications.

In another welding adaptation, Sullivan, U.S. Pat. No. 3,480,756, employs magnetic sensors to position a welding head with respect to a seam to be welded between which relative movement occurs. Magnetic systems lack the precision and general range of usefulness of the optical sensors, being, as they are, limited to certain magnetic materials, being insensitive to small changes or details in the welding path or work to be sensed unless too close to the work to preserve the probe's integrity, or so close as to interfere with the welding or tool itself.

In still another welding system, Iceland, U.S. Pat. No. 3,775,582, employs focused microwave energy with an interferometer to track a weld seam. Microwaves require a work surface that is made of conductive material in order for the waves to effectively reflect back to the receiver. Use of an interferometer presents the possibility of the system confusing the intended distance between the antenna and the work surface, and a distance one wave length longer or shorter. If a lower frequency which has a longer wave length is used, then the ability of a reasonable sized antenna to focus the waves is correspondingly reduced. Microwaves have the additional disadvantage of dispersing into the environment with attending problems of causing interference and raising the question of exposure to humans.

Erdman et al., U.S. Pat. No. 2,743,429, employs ultrasonic waves to measure the distance by echo time to a work piece, but can encounter the same possibility of confusing the distance with a distance one wave length longer or shorter, and provides no means for focusing the sonic energy so that it can be used as a probe to detect small details, objects or weld seams.

Davis et al., U.S. Pat. No. 4,012,588, and Whetstone et al., U.S. Pat. No. 3,821,469, employ a widely dispersed shock wave to locate a point in space but also do not employ any means to focus the energy so that the device can be used as a probe.

In my prior pending application, Ser. No. 155,944, filed June 3, 1980, for "Shockwave Probe", there is disclosed a probe that guides a welding torch or tool through shock wave signals beamed at the joint to be welded or part to be sensed, the echoes from which are translated into an electric signal which provides the robot a means to cause the welding torch or tool to locate and track the welding path or work without physical contact with the work piece. This is, essentialy, a shock wave method for producing an echo in which the elapsed time between sending the shock wave signal, and the reception of its echo, is compared with a pre-selected standard, and torch or tool controls are made to respond to comparative differences thus detected.

While ultrasonic echo devices exemplified by Erdman et al, "Automatic Positioning Device", identified above, afford many advantages over other prior art devices, some of which devices are discussed above, certain disadvantages have been revealed therein as well. Among these are limited accuracy, and sensitivity to extraneous noises. The limitation on accuracy is, in part, due to the characteristic in such an acoustical system, by definition, to detect acoustical waves that lie beyond an initial oscillatory cycle, thus, introducing uncertainty and the possibility of error up to one wavelength. The first cycle received starts from zero amplitude, with considerable interference from extraneous noise, and increases in amplitude within the next few cycles, with the result that the accurate location of any point on the first cycle is obscured. This problem can not be solved through the use of higher frequencies, due to the fact that the ambient atmosphere readily absorbs frequencies not greatly exceeding 100 KHz.

SUMMARY OF PRIOR ART AND POINT OF DEPARTURE

From the foregoing discussion of prior art contactless probes, it is apparent that they share in common the use of radiant energy in some form that is translated into useful intelligence by which control means, such as a robot, is caused to direct a tool in the performance of an intended function. Successful application depends upon the form of the energy employed, the success with focusing that energy, and the clarity and selectivity of the signals it generates. These signals must be essentially immune to interference from extraneous influences in the environment of application, and translate into the control function with precision, sensitivity, and criticality. The present invention uses portions of the prior art from various sciences and combines these portions into a novel approach that advances the state of the art and makes possible the practical application of a remote contactless probe for tool guidance that is not damaged by severe conditions as are present in the immediate vicinity of a welding torch, and that does not interfere with the tool.

SUMMARY OF THE INVENTION

The present invention pertains to probe means and method for generating a shock wave, representing a substantially unitary, abrupt pressure-change, propagated through the ambient atmosphere. The shock wave originates from a heavily damped piezo assembly and exits through a multi apertured lens which forms a curved wave front that focuses into an narrow region of space. For receiving the echo a similar or the same multi apertured lens selectively collects a similar curved wave front reflected from the same region of space. The probe electronically confines the sensitivity to signals to those that are so abrupt as cannot be propagated through the ambient atmosphere for more than a few inches, thereby further rejecting extraneous noise. The returned signal wave shape is compared against a set standard, for particularly noisy applications. The time between the transmission of the shock wave and the reception of its echo is translated into a distance related voltage. The returned signal strength is monitored for information pertaining to the area of reflective surface within the said region of space, or to the presence of an edge of the work piece, or to the width of a weld seam, or to the deviation from perpendicular alignment of the work piece. Such voltage and information permits positioning of a tool in response.

DESCRIPTION OF THE PREFERRED EMBODIMENTS

Preferred embodiments of the invention comprise means and method for sensing, without physically touching, the location and shape of one or more objects, including grooves of seams in an object, by the use of a small shock wave, generated and focused by a variety of ways and means, as described hereinafter, that is reflected off of the object(s) being sensed, the reflected image being intercepted and compared as to time with the original shock wave, and compared with set references as to its strength and amplitude versus time, with this intelligence then being translated into a recognition or position signal.

The term "shock wave", as used herein, is defined as a compression or rarefaction wave in the ambient atmosphere formed by an electrical discharge or a generating surface's being moved from a position of rest to a position of maximum displacement (usually of some micrometric value) at a high speed or other such method; said compression or rarefaction wave having a disturbed region of small but finite thickness within which very abrupt changes in pressure, density, and velocity occur within the ambient atmosphere, defining a single, steep-faced wave front, followed by a less steep, though rapidly decaying gradient. Any cyclical component that might occur riding on top of the shock wave is electronically rejected since these unwanted waves occur after the shock wave front.

The shock wave is demonstrably different from prior contactless probes in that the effective pulse is non-cyclical, as opposed to the burst of wave cycles inherent in the energy forms utilized by probes of the prior art, i.e., light waves, microwaves, and ultrasonic pulsations in air. For clarity it is understood that cyclical does not herein refer to the need to occasionally repeat the generation of a signal in order to update information from previous echo signals.

Shock waves normally weaken due to the spreading of the pressure front and due to friction or absorption by the air. By focusing the shock wave according to the present teachings, its energy may be concentrated and maintained far longer than the norm, so that its reflection is much crisper in definition and resolution as to its comparative values of time and pressure, than is possible with an unfocused group of waves that characterize the sonic and ultrasonic probes of the prior art.

In another embodiment, the probe is caused to move in a scanning or raster pattern so that an image can be built up similar to a line scan or raster scan television camera of an object or the probe's environment, with the addition of depth information more like that of side looking radar, in some device like a computer for analysis or a CRT screen for viewing.

Figure 1:
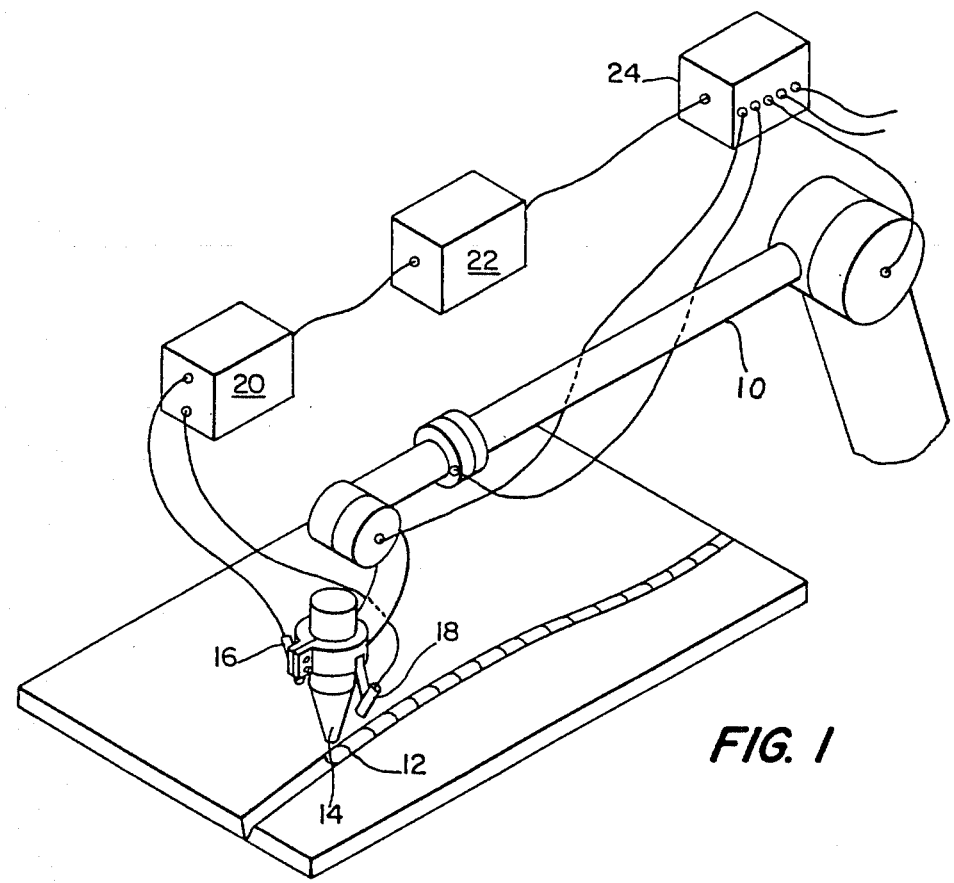
FIG. 1 is a schematic perspective view of a portion of a welding robot system showing a probe of the present invention in a preferred position for guiding the welding torch.
Figure 9:
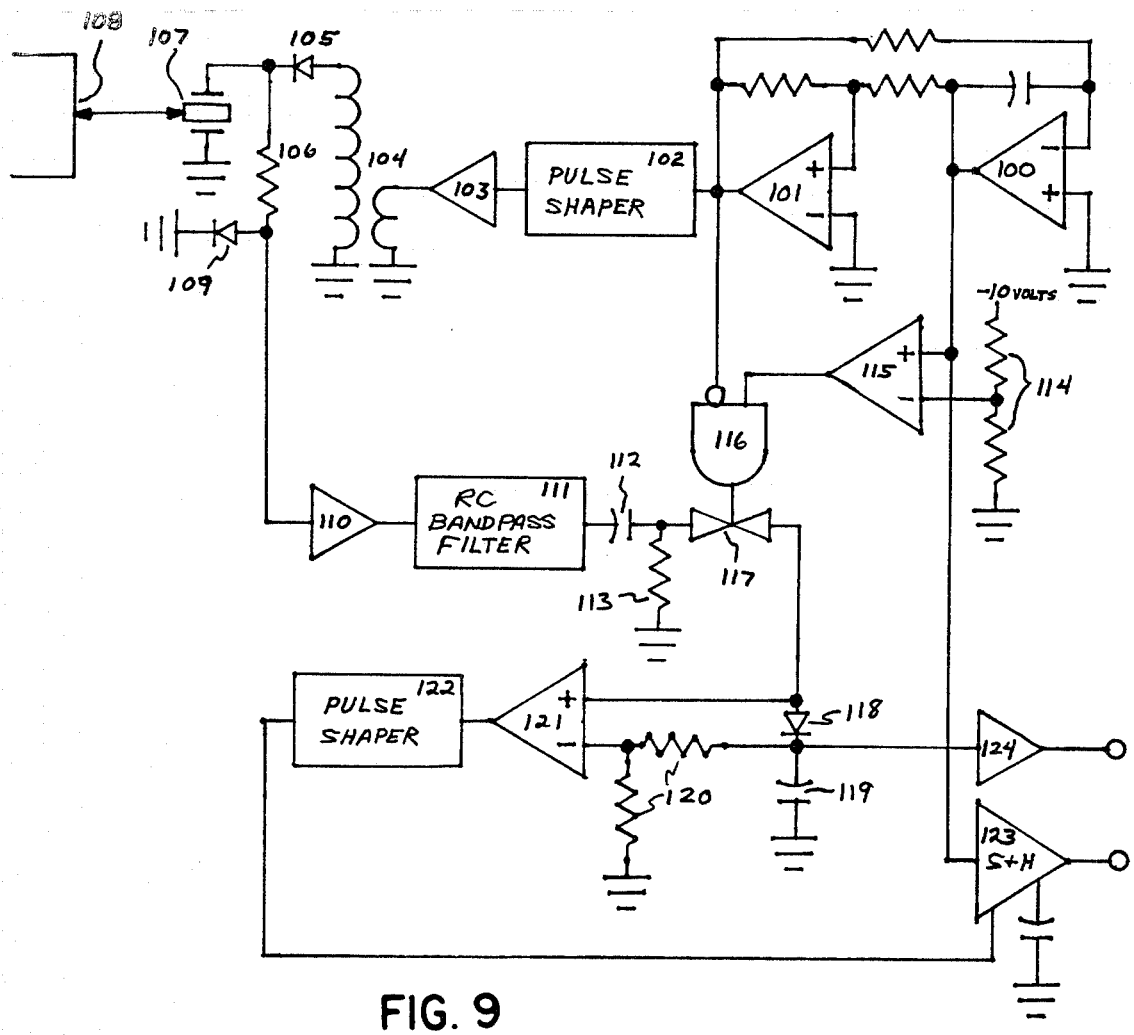
FIG. 9 is a circuit diagram that schematically represents a preferred simple circuit for implementing the intended functions of probes according to the present invention.
Figure 10:
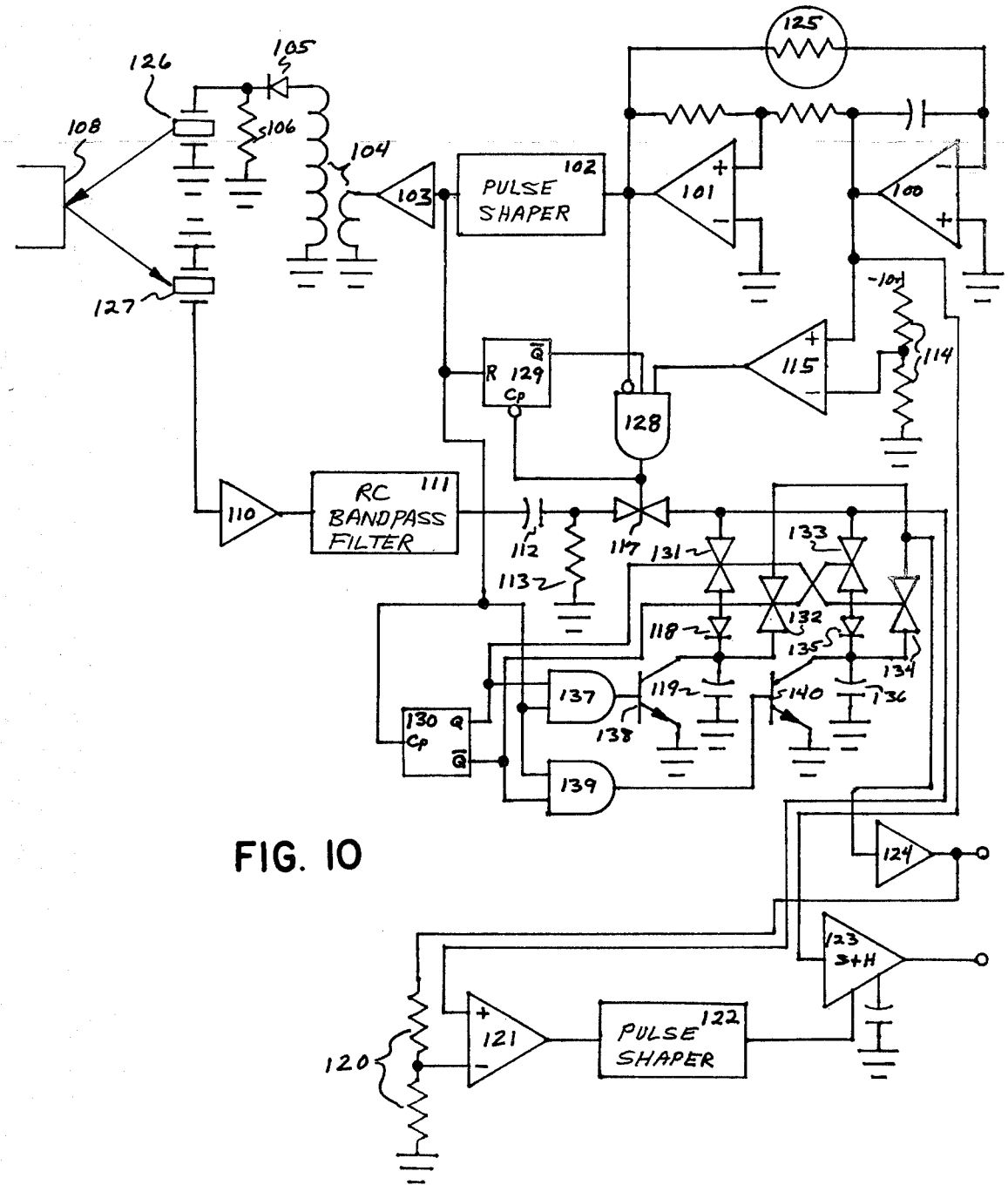
FIG. 10 is a circuit diagram that schematically represents a preferred circuit for implementing the functions of FIG. 9 with the additional functions of a separate transmitter and receiver, a fast responding echo strength circuit, atmospheric compensation such as temperature, and a second echo rejection circuit, according to the present invention.
Figure 11:
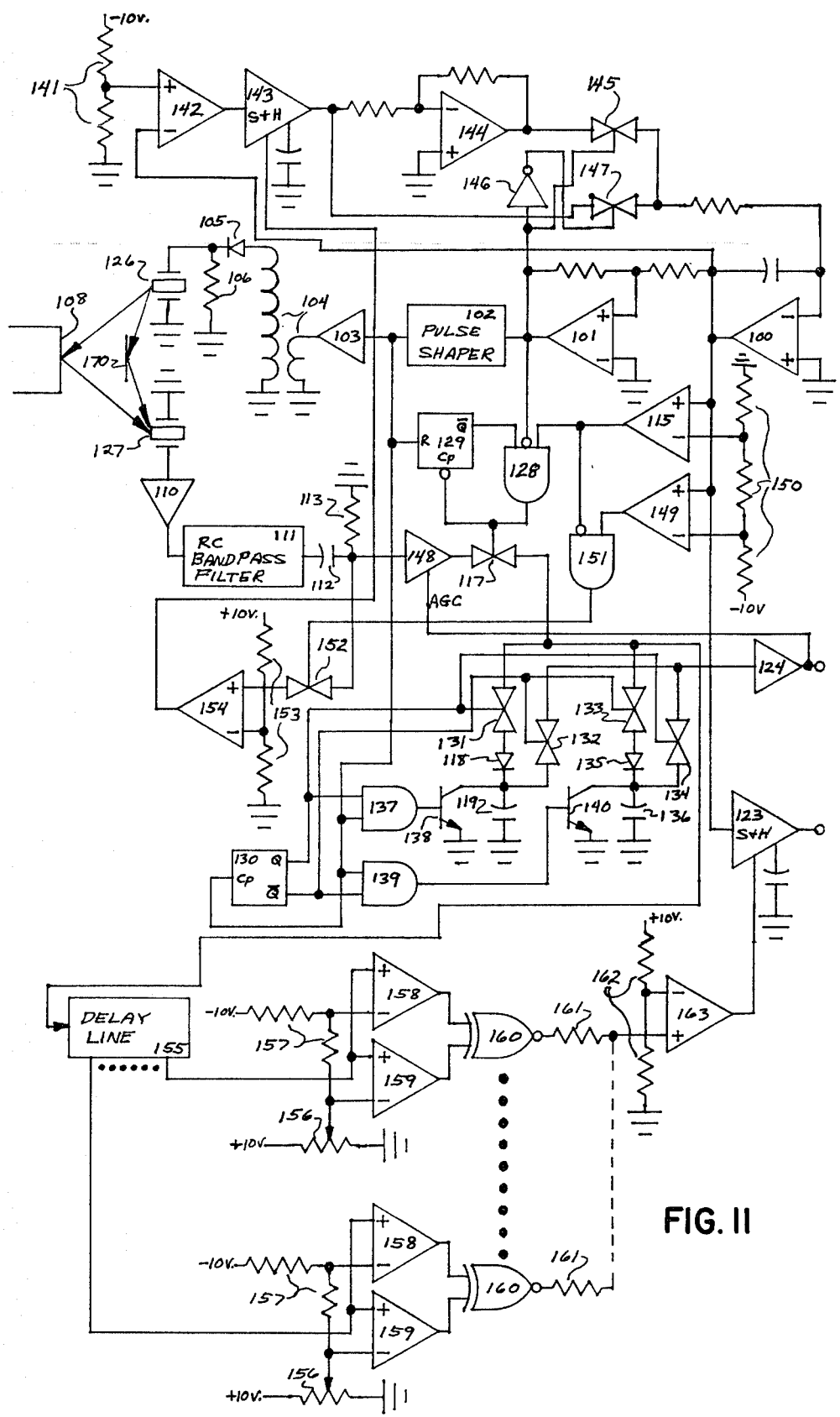
FIG. 11 is a circuit diagram that schematically represents a preferred circuit for implementing the functions of FIG. 10 with the additional functions of a compensator circuit employing a reference reflector for variations in the atmosphere and a wave shape reference and comparator circuits for particularly noisy applications.
Figure 1:
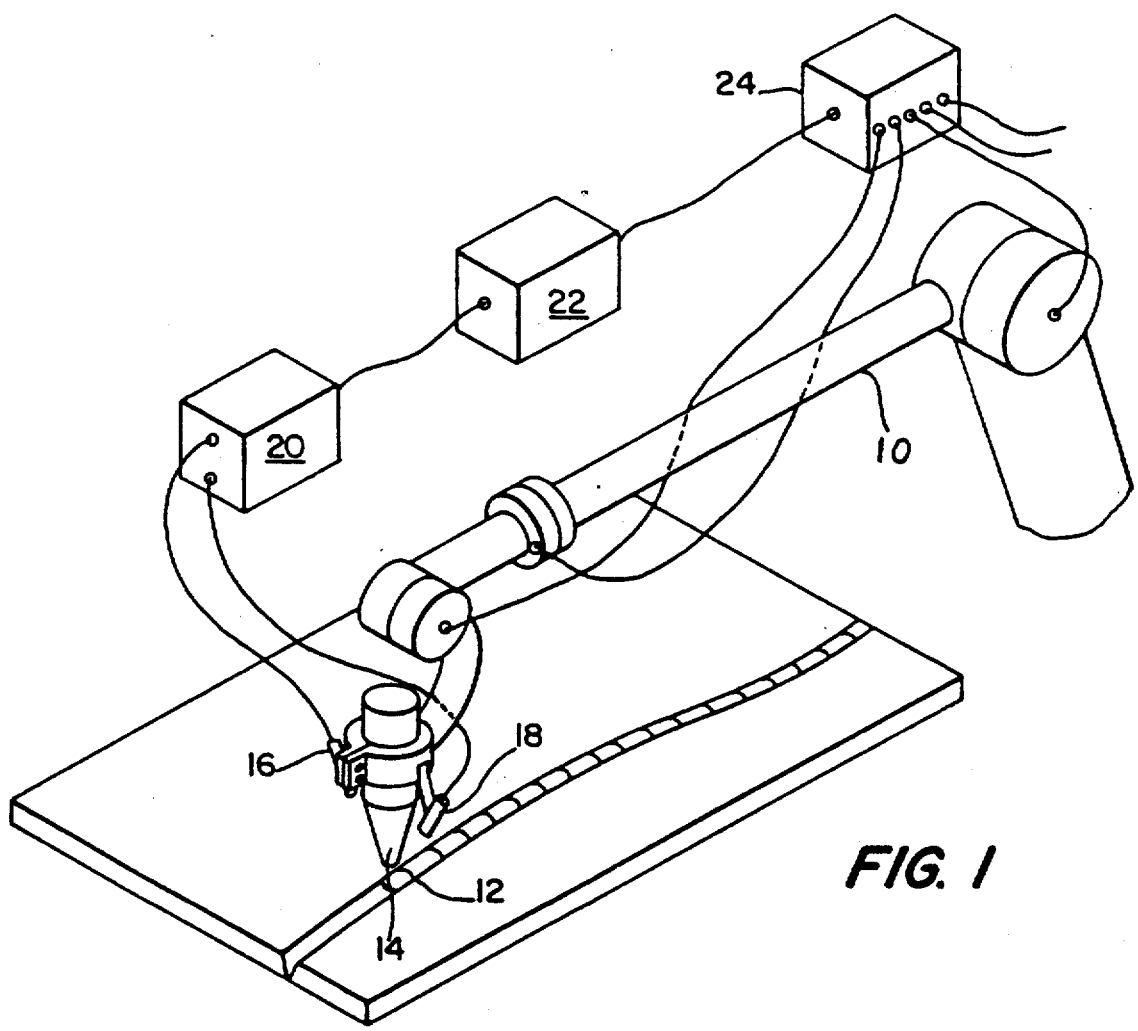

In the drawings, FIG. 1 depicts a welding robot 10 welding a seam 12 with a welding head or torch 14. Probes 16 and 18, as shown, can be used in one of two ways: (1) the probe 16 can be a shock wave transmitter, and probe 18 the receiver of the reflected shock wave (or vice versa), in which case, the control box 20 would contain a single transmitter driver, a single receiver amplifier, and other circuits as shown in FIGS. 9, 10, or 11. The robots controls 24 could respond to the signals from the probe control box 20 and position the robot mechanics 10 so that the position of the probe in relation to the groove of the seam 12 where the reflected shock wave is weakest, or on the edge of the groove where the reflection begins to weaken; (2) the probes 16 and 18 can each be transceivers, wherein probe 16 intercepts its shock wave reflection off of the far side (probe 18's side) of the V-groove comprising the seam 12 to be welded while probe 18 intercepts its wave's reflection in the same way from probe 16's side of the V-groove 12. In this second example, control box 20 would contain two transmitter drivers, operable in alternation so as not to interfere with or confuse the signal received by the opposing, momentarily inactive probe, two receiver amplifiers also operated in alternation, and two sets of the other circuits as shown in FIGS. 9, 10, or 11. The times to echo interception and/or echo strengths between the two probes may be equated or differentiated. Any difference can then be triangulated as between the two probes and the welding seam, so that the coordinator 22 which is a part of the robot controls, can command the drivers in box 24 to energize the robot 10 to correct the position errors, and balance the system. In both cases, the welding torch is accurately positioned with respect to the seam to be welded to perform the welding operation, and is maintained in such position during relative movement between the seam and the torch, notwithstanding geometric variations.

The electronic components 22 and 24 are known to the robot art and are a part of the robot that by chance be used and need no further description or explanation beyond their general functions, inasmuch as they do not, per se, constitute a part of the present invention.

Figure 2:
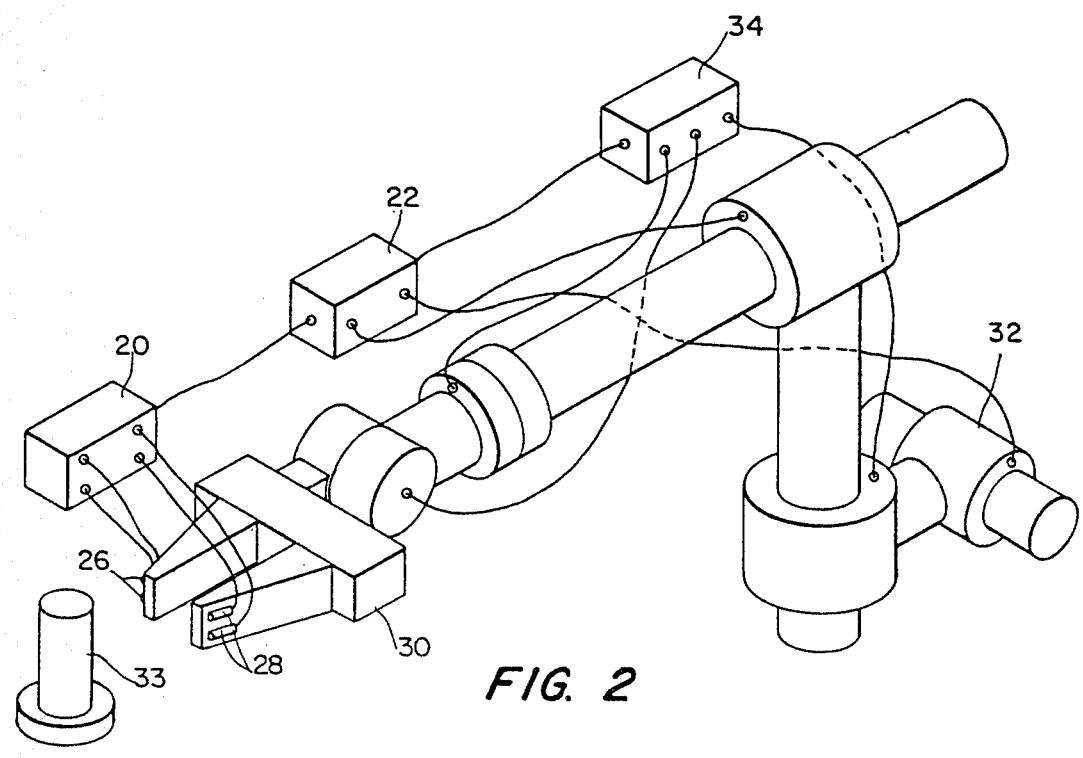
FIG. 2 is another perspective view similar to FIG. 1 of a linear slide system with a gripper guided by two probes of the present invention toward an object to be grasped.

FIG. 2 shows the transmitter and receiver of shock wave probe 26, and a second transmitter and receiver of shock wave probe 28, applied to a gripper 30, of a linear slide device 32, to guide the gripper 30 in its movement toward an object 33 to be handled. Linear slide devices are frequently applied in materials handling, welding, and torch-cutting usages, so that the illustrated configuration should be taken as an example without limitation. Control box 20 then provides signals directly to drivers in box 22 to move the left/right slide 32 until the distances to the object 33 from the probes 26 and 28 match. The actual in/out position matches with the inward moving commanded position to, in turn, control the position of the in/out slide 36, to tell the sequence control box 34 the precise location of the object 33. A single probe between the gripper jaws could also locate the object if moved in a scanning pattern.

Figure 2A:
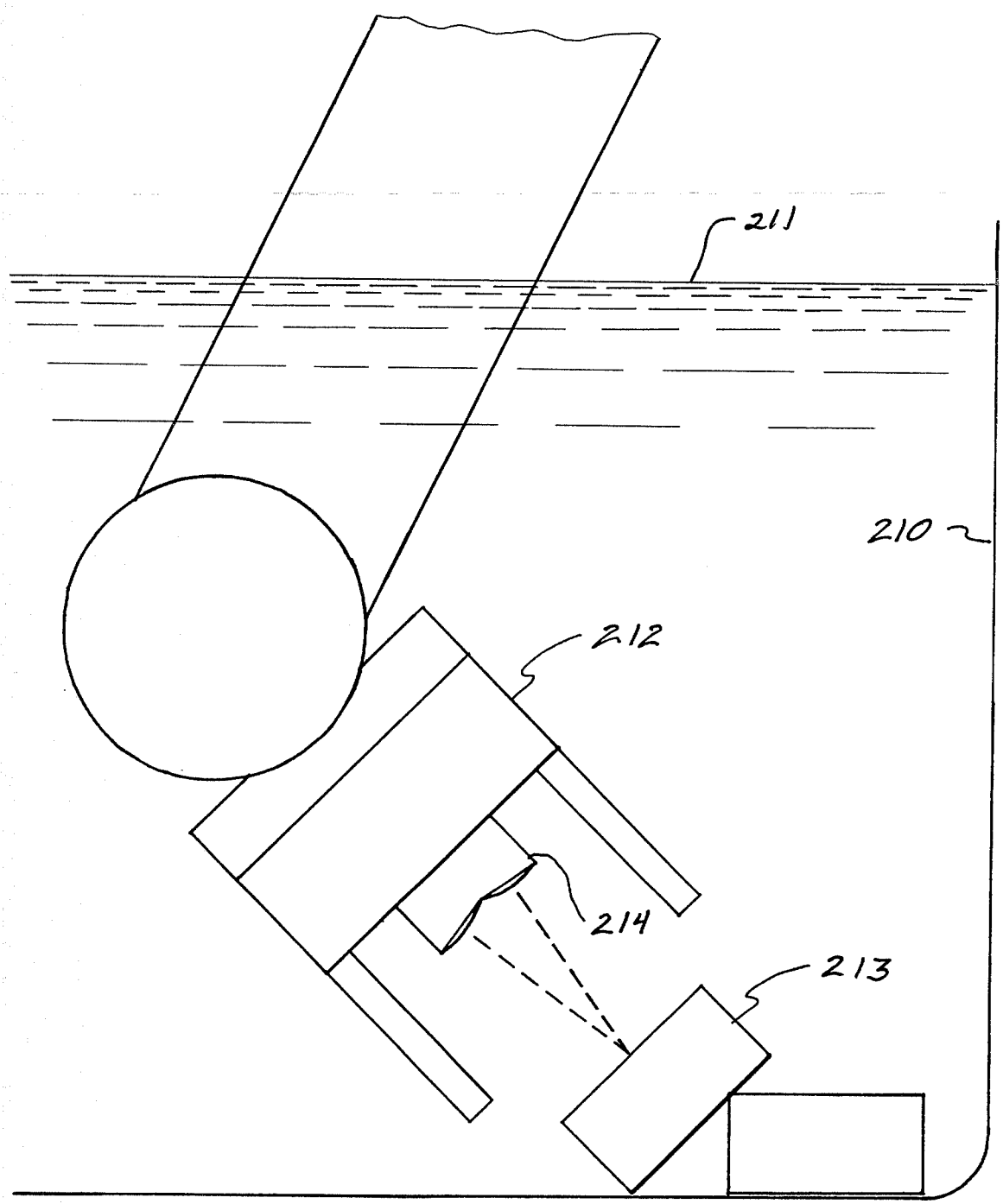
FIG. 2A is a side view of a robot gripper being guided toward an object by a probe of the present invention beneath the surface of a fluid.

FIG. 2A is a side view into a container 210 of fluid 211 wherein a robot gripper 212 is being guided toward an object 213 by a probe 214 made according to the present invention. The passages 56 need to be filled with the fluid to provide effective conductance of the shock wave up the passages 56 and out to the object 213 and back.

Figure 4:
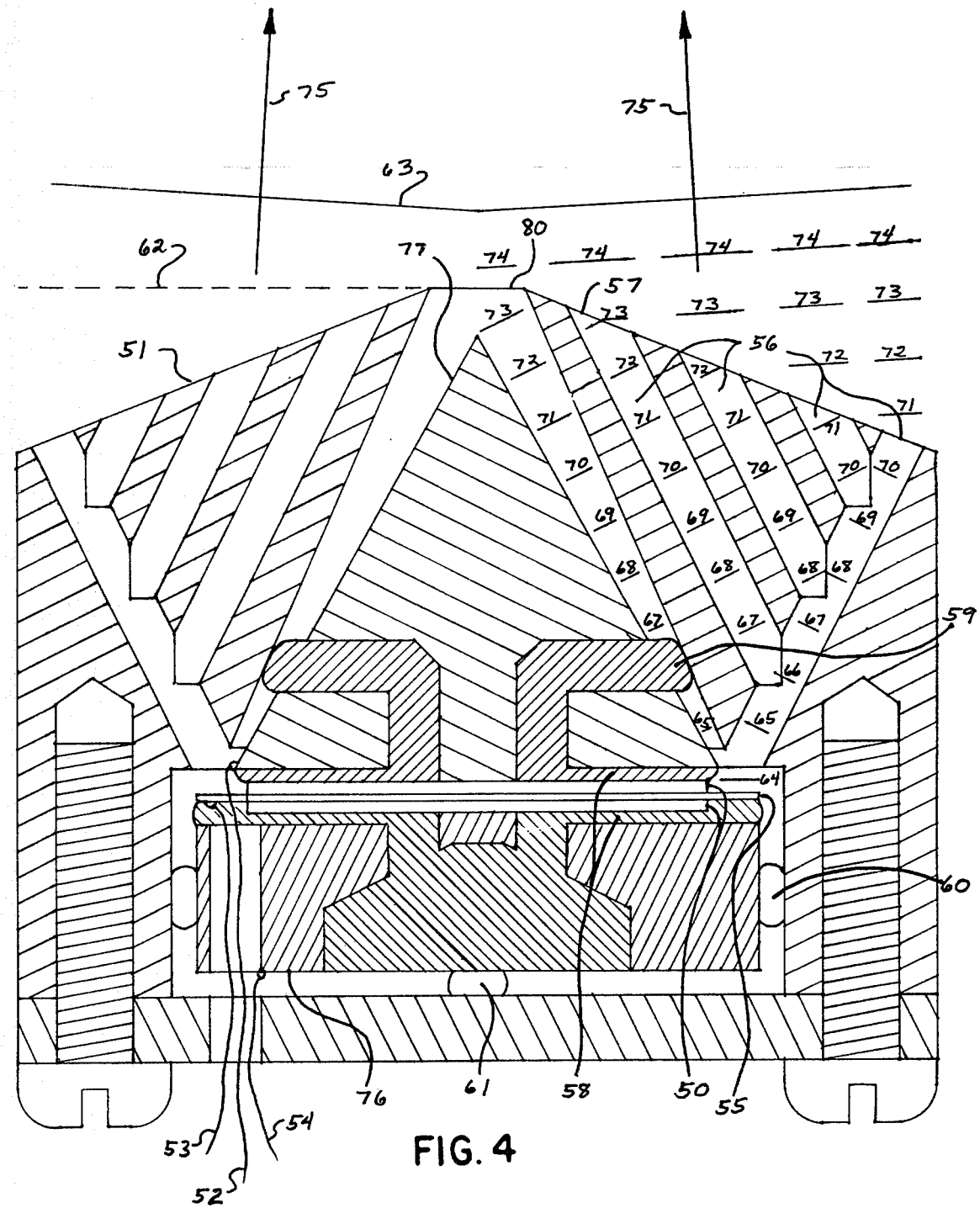
FIG. 4 is a vertical sectional elevational view of the probe assembly containing the piezo bender disc and conical lens made in accordance with the present invention.

The gripper and probe must in this case be moved so that the edges of the object 213 are located and then the center so that the gripper 212 is centered on the object 213 before moving forward and grasping the object 213. A conical lens as depicted in FIG. 4 could provide sufficient depth of field to sense the object 213 during the approach of the gripper 212 and continuously verify the presence of the object 213 in the grasp of gripper 212.

Since the lens action of sensor 214 is dependent solely on the difference of length of the passages 56, the shock wave will focus at the same distance, but the echo time will depend on the speed of sound in the fluid and the echo strength will depend on the degree of absorption of the shock wave by the fluid.

Figure 2B:
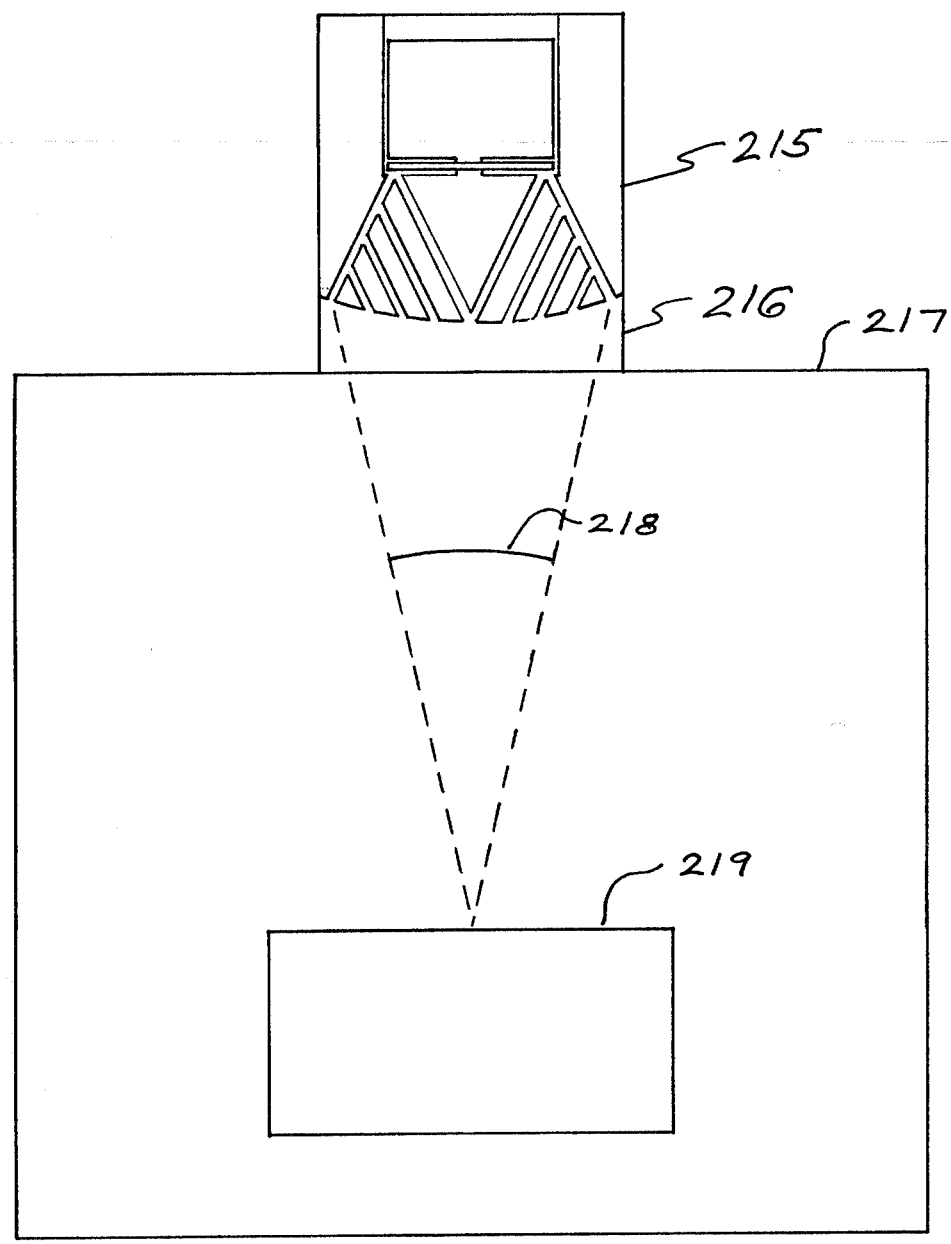
FIG. 2B is another side view of a probe of the present invention filled with a solid plastic and in contact with a solid containing an object or cavity to be sensed.

FIG. 2B is a vertical sectional elevational view through the center of a single probe assembly 215 used as a transceiver and filled with a solid plastic 216 which has less density and/or less stiffness than the material of the lens of the probe 215 and is similar with the density and stiffness of the solid 217 which is to be penetrated by the shock wave 218 in order that object 219 imbedded in solid 217 can be sensed.

As in FIG. 2A the passages 56 must be filled with the plastic 216 to provide effective conductance of the shock wave. An oil or similar substance may be required at the interface between solid 216 and 217 to prevent unwanted reflections at the interface.

Uses of this arrangement are the probing of electronic circuits imbedded in silicone rubber, and probing human tissue for detecting bone and cavities with a higher clarity then present ultrasonic probes.

Figure 3:
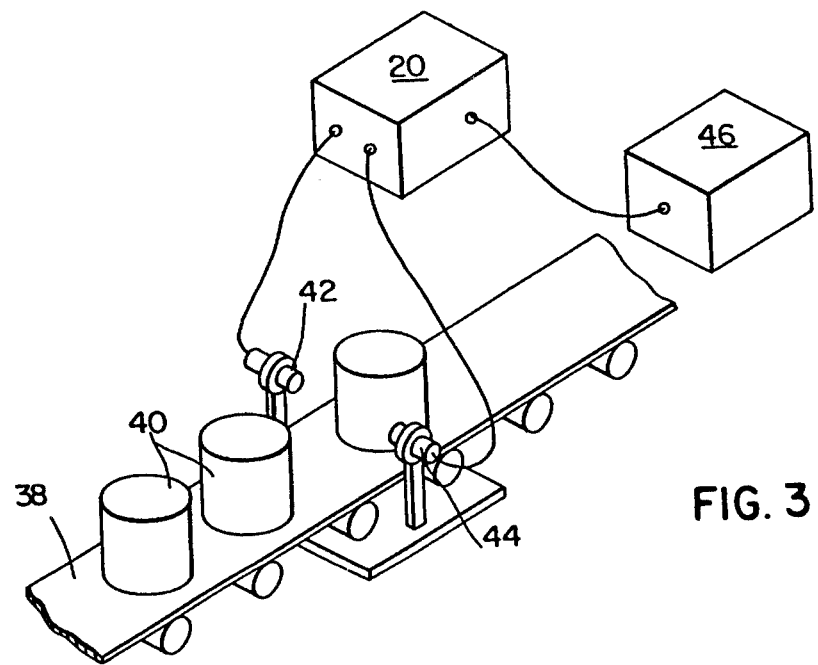
FIG. 3 is still another schematic perspective view of a conveyor system having a probe of the present invention for detecting articles being conveyed thereon.

FIG. 3 depicts a conveyor 38 moving parts 40 past probes 42 and 44, as opposed to the probes moving with respect to the work-object, as in the preceding examples. Also, as previously described, the probes 42 and 44 can be transceivers for sensing the extent the parts 40 might be off-center on the conveyor 38, or for measuring the width of the parts 40 by summing the distance signals in the control box 20. Alternatively, one of the probes 42 or 44 can be a transmitter, and the other a receiver, to detect each part 40 at the position where it eclipses the shock wave emitted from the transmitting probe, so as to prevent its reaching the receiving probe. In this instance, control box 20 would signal sequence control box 46 to count the part, or signify that the part is in position to undergo some ensuing programmed operation farther along down the line.

FIG. 4 is a vertical sectional elevational view through the center of a single probe unit, showing the resiliently mounted assembly containing the two piezo bender discs 50 and the multi apertured lens 51. Obviously an appropriately designed magnetic disc with the magnetic air gap at its outer circumference to a driving or receiving coil beneath the disc could replace the piezo disc assembly. In the case where this assembly is a generator of shock waves with a piezo bender, the faces of the discs 50 could be of opposite polarity and the upper and lower surfaces of the combined assembly of the two discs would be connected together via leads 52 and 54, and the sudden voltage change applied between the combined leads 52 and 54, and the lead 53 which is connected to a thin metal disc 55 which is bonded between the piezo discs 50. In the case where this assembly is a transceiver, the sudden voltage change could be provided in two opposite polarities and connected to leads 52 and 54 with respect to lead 53, and the piezo discs would in this case have like polarities facing each other. In any case the combined piezo discs are caused to bend slightly into a convex shape suddenly. This sudden motion creates the shock wave and it propagates up the passages 56 drilled in a pattern around the perimeter of disc 55, and exits surface 57 in such a manner that the shock wave is pieced back together, but now in the shape of a curved or conical shaped wave front which converges in the desired focusing action.

Resilient, energy absorbent material 58 dampens the motion of the piezo disc assembly to minimize unwanted vibrations, in either the case where this assembly is a transmitter, receiver, or transceiver. The piezo disc assembly is center mounted to masses 76 and 77 which minimize the motion of the center of the piezo disc assembly. The resiliently mounted assembly containing the piezo discs 50 is resilently supported by pads 59 and 60 placed around the assembly, and a pad or pads 61 which in part support against the counter force from pads 59 sitting in a tapered passage.

Multi apertured lens 51 serves multiple purposes, namely to focus the shock wave, to provide a larger radiating source diameter of about an inch without enlarging the diameter of the piezo discs which would reduce their ability to move quickly, to provide a means to form a sufficiently continuous wave front from the ring-shaped generating surface of the exposed area of disc 55, to mechanically protect the piezo assembly, to shield the piezo assembly from the intense infra-red radiation present near a welding torch, and to absorb the heat from any hot gases that might come in contact with the front of the probe.

If conical or curved surface 57 had been made flat such as phantom surface 62, then the passages 56 would be of equal length if the passages are all of equal angle with respect to the surface of disc 55 and leaning inward or outward along radii originating from the central axis of the probe. It should be apparent that the shock wave will arrive at the phantom surface 62 simultaneously, and as it propagates forward reform into a flat wave front. If phantom surface 62 is made conical such as surface 57, then the shock wave traveling up the outer passages will reach the surface 57 sooner than the inner passages. Since shock waves spread according to their nature, the portion of the spreading wave front from the outer passages traveling directly toward the resulting wave front 63 will have a shorter total distance from the disc surface 55 to the resulting wave front 63, than the shock wave from the inner passages. This causes a tilting of the direction of motion 75 of the wave front 63 slightly toward the central axis of the probe, and results in shock wave front 63 assuming an inverted conical shape which focuses it to cause the front 63 to converge on a volume of space at the intended distance out in front of the probe where the work surface will be. Different curvatures of surface 57 will impart different shapes to the volume of sensitivity at the intended distance. Line segments 64 through 74 show the sequential position of the shock wave as it moves up the passages 56.

Figure 5:
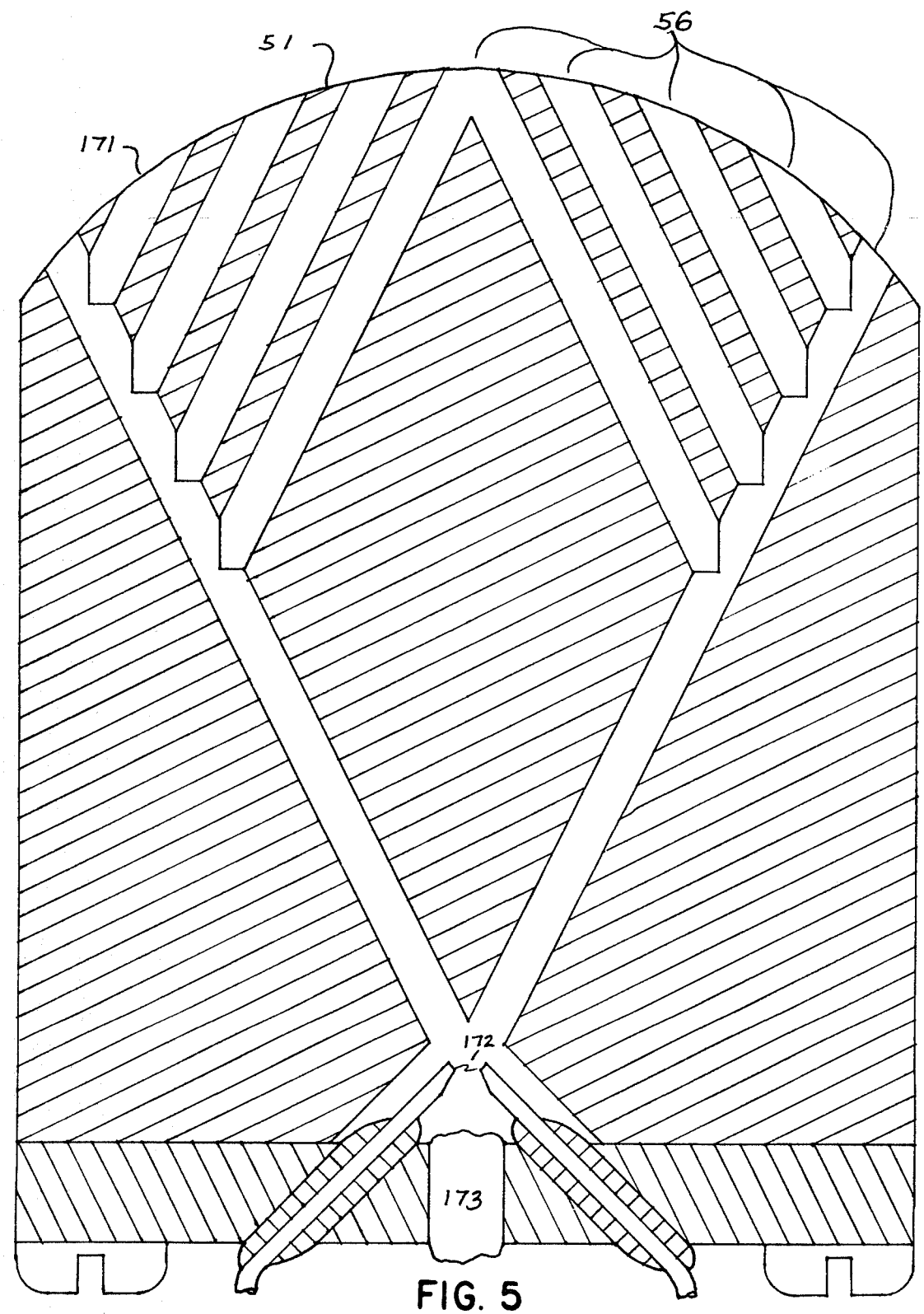
FIG. 5 is a vertical sectional elevational view of a transmitter containing a spark shock wave source and a curved lens made in accordance with the present invention.

FIG. 5 is a vertical sectional elevational view through the center of a transmitter employing a spark 172, and also optionally employing a lens 51 with a curved surface 171 which is designed to form a spherical wave front of the opposite curvature to focus and converge more to a point at the intended distance.

Passages 56 behave in a similar manner as described in FIG. 4. When a point source is used such as a spark, the outer passage must extend back to the point source, whether a curved or conical lens surface is used. Absorbent material 173 dampens all vibrations in the passages.

Figure 6:
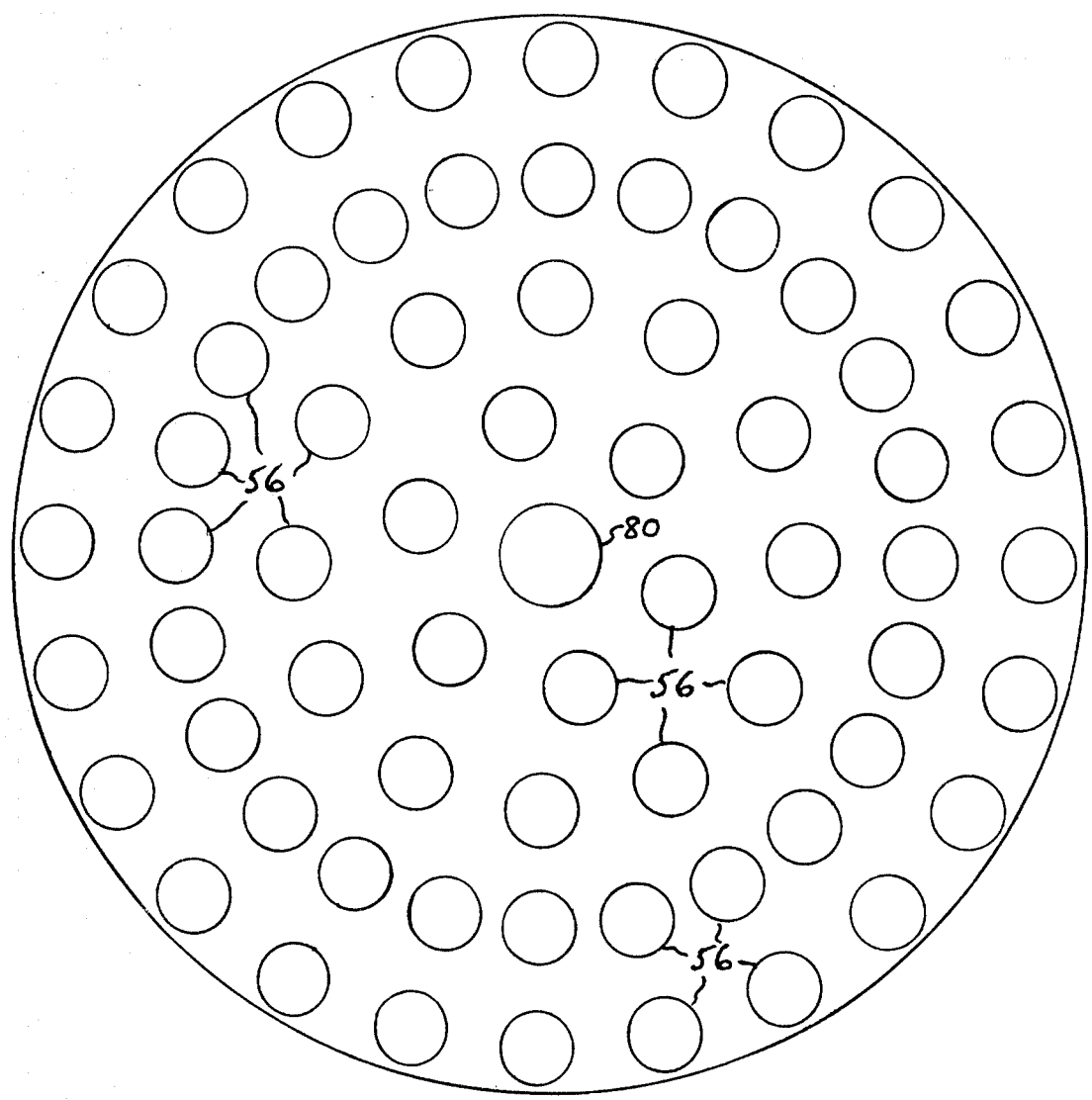
FIG. 6 is a top plan view of a probe assembly unit, similar to those shown in FIGS. 4 and 5 showing a possible pattern of the holes of the multi apertured lens made in accordance with the present invention.

FIG. 6 shows a possible pattern of the holes which are the outer ends of the passages 56 in FIGS. 4 and 5. The hole in the center 80 of FIG. 4 is the outer opening of the space between the mass 77 and the central inner conical surface of lens 51. This space is tapered so that the center of the space is at the same angle as the passages 56 with respect to the center axis of the probe and so that the intensity of the shock wave at the surface 57 is about the same just outside of the central hole 80 as just outside the passages 56.

The apertures, holes, or passages 56, shown in FIGS. 4, 5, and 6, as described above, may be of any suitable size or shape best adapted to a given application in association with the particular shock wave generator selected, to concentrate or focus shock wave emissions to an optimal degree. Those illustrated herein, given as examples without limitation, have bores of approximately 0.040 inch in diameter, but may be larger or smaller by empirical dictates, and may be other than round, e.g., annular slots, elongated ovals, arcuate oblongs, or square configuration, so long as the concentration and focusing of the shock wave emissions are achieved in keeping with the teachings of the present invention.

Figure 7:
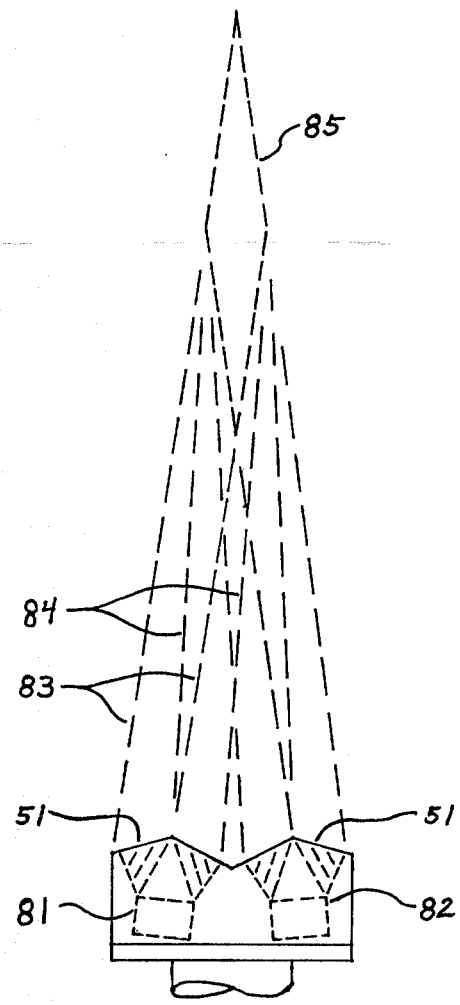
FIG. 7 is a schematic side view showing the area of sensitivity in front of the probe of the present invention as a result of one possible lens design as shown in FIG. 4.

FIG. 7 is a schematic side view showing the area of sensitivity in front of the probe of the present invention as a result of one possible lens design as shown in FIG. 4 comprising a conical front surface 57. Transmitter 81 forms a converging ring shaped shock wave which outer portion 83 and its inner portion 84 cross at the area of sensitivity 85 and form an elongated double cone. Receiver 82 is sensitive within a similar elongated double cone. The area of sensitivity 85 is the common area of the elongated cones of both the transmitter and the receiver. For illustration purposes FIG. 7 is highly simplified with the mentioned boundaries being in reality blurred and the maximum shock wave strength and sensitivity are along the center line of the transmitter and the receiver. Nonetheless, FIG. 7 agrees closely with the actual sensitivity area shape, and conveys the configuration and function of the lens.

Figure 8:
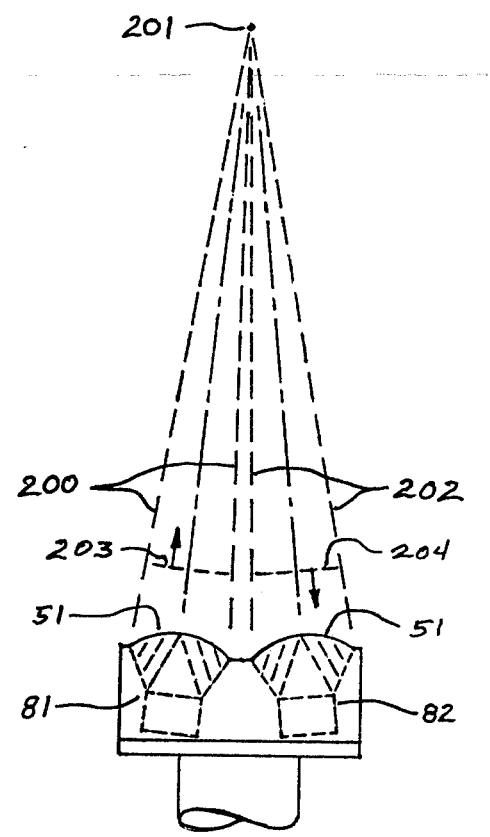
FIG. 8 is a schematic side view showing the area of sensitivity in front of the probe of the present invention as a result of one possible lens design as shown in FIG. 5.

FIG. 8 is a schematic side view showing the area of sensitivity in front of the probe of the present invention as a result of a curved front surface in place of conical surface 57. Transmitter 81 generates a shock wave that curved lens 51 forms into a spherical wave front 203 which center is at the intended distance 201 and converges along the path 202. Curved lens 51 converges wave front 204 onto the receiver 82. For illustration purposes FIG. 8 is highly simplified with the mentioned boundaries being in reality blurred and the maximum shock wave strength and sensitivity are along the center line of the transmitter and the receiver. Nonetheless, FIG. 8 agrees closely with the actual sensitivity area shape, and conveys the configuration and function of the lens.

Figure 8A:
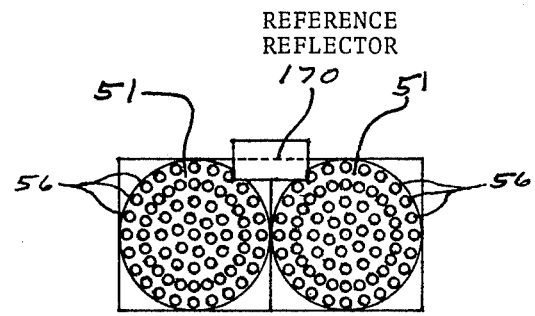
FIG. 8A is a top plan view of the configurations shown in FIGS. 7 and 8, shown with the phantom lines ommitted.

FIG. 8A is a top plan view of a possible pattern of the holes 56 in the lens surface 51 of the configurations shown in FIGS. 7 and 8.

FIG. 9 is a circuit diagram that schematically represents a preferred simple circuit for implementing the intended functions of probes according to the present invention, which diagram is offered as an example without limitation for purposes of illustration only.

Integrating amplifier 100 and hysteresis amplifier 101 constitute an oscillator that generates both a triangular and square wave signal. The square wave comes from amplifier 101 and passes through pulse shaper 102 where it is transformed into a narrow pulse on the falling edge of the square wave. Amplifier 103 drives transformer 104 with the pulse. The pulse voltage is stepped up by the transformer 104, passes through diode 105 and puts a sudden charge onto the conductive surfaces of piezo device 107. Resistor 106 bleeds the charge off of piezo device 107. As a result of this sudden voltage rise and relaxation piezo device 107 suddenly changes shape and relaxes which causes the sudden pressure wave to appear and travel to the work surface 108 where it is reflected back to piezo device 107 after the charge has been bled off by resistor 106. Diode 109 protects amplifier 110 from the high voltage. The returning shock wave is generally very weak and is amplified by amplifier 110 to an easy to handle voltage where the received sudden voltage is passed through the RC bandpass filter 111 where audio and ultrasconic signals as well as much higher frequencies are rejected, letting only the sudden voltage change through. Capacitor 112 and resistor 113 restore the average voltage to zero which represents the ambient pressure just before the sudden pressure wave.

Comparator amplifier 115 switches to the plus state shortly after the transmit pulse is generated and with a delay time that is determined by the voltage divider 114. Gate 116 ensures that the signal from amplifier 115 is on the rising side of the triangular wave form from integrator 100. Gate 116 thereby turns on analog gate 117 which allows the pulse from capacitor 112 to pass after all disturbances from the transmitted pulse have subsided. Diode 118 passes the highest voltage of the pulse into capacitor 119 which stores the voltage of the peak. Voltage divider 120 sets a threshold for comparator 121 at one half the peak voltage so that comparator 121 switches high at the mid point of the sudden pressure rise which is an accurate time related point on the shock wave even as the sudden pressure rise decays by spreading with longer echo distances.

Pulse shaper 122 forms a narrow pulse upon the rise of comparator 121, which in turn causes sample and hold amplifier 123 to record and hold the instantaneous voltage of integrator 100, which held voltage represents the time of transit of the shock wave. The output from the sample and hold device 123 is provided to the control circuits. The output from amplifier 124 provides to the control circuits a signal representing the strength of the returning shock wave.

FIG. 10 is a circuit diagram that schematically represents a preferred circuit for implementing the function of FIG. 9 with the additional functions of a separate transmitter and receiver, a fast responding echo strength circuit, atmospheric compensation such as temperature, and a second echo rejection circuit, according to the present invention, which diagram is offered as an example without limitation for purposes of illustration only.

The integrating amplifier 100 varies its ramping rate according to a properly selected atmospheric sensing device such as a thermistor 125. A transmit pulse is generated as in FIG. 9 except that transceiver piezo device 107 is replaced by a transmitting piezo device 126 and a receiving piezo device 127. After the returning shock wave signal is amplified by amplifier 110 and unwanted signals eliminated by RC bandpass filter 111, the average ambient level is reestablished by capacitor 112 and resistor 113, such as in FIG. 9. Analog gate 117 is only allowed on for the first pulse whereby flip flop 129 triggers on the fall of the first pulse and gates off gate 128 for any further pulses during any cycle of the oscillator constituted by integrator 100 and and hysteresis switch 101. Flip flop 129 is reset when the next transmit pulse occurs.

In the place of diode 118 and storage capacitor 119 a pair of diodes 118 and 135 and capacitors 119 and 140 are used with analog gates 131, 132, 133, and 134 which alternate between the diode and capacitor pairs so that each capacitor can be reset to zero alternately at the time of the transmit pulse. Flip flop 130 alternates, triggered by the transmit pulse rise which allows passage of the transmit pulse alternately through gate 137 and 139 to reseting transistors 138 and 140 respectively. When the reset pulse resets capacitor 119, analog gate 131 is allowed to open and thereby diode 118 passes the highest voltage signal to capacitor 119. Meanwhile the voltage on capacitor 136 from the previous shock wave echo is connected via gate 134 to the echo strength output amplifier 124 and also the voltage divider 120 which provides a voltage threshold for comparator 121 of one half the peak signal voltage. When flip flop 130 triggers again, the corresponding other set of analog gates are used in a like manner.

Pulse shaper 122 and sample and hold amplifier 123 function as in FIG. 9.

FIG. 11 is a circuit diagram that schematically represents a preferred circuit for implementing the functions of FIG. 10 with the additional functions of a compensator circuit for variations in the atmosphere employing a reference reflector 170, and a wave shape reference and comparator circuits for particularly noisy applications, which diagram is offered as an example without limitation for purposes of illustration only.

The voltage which feeds the resistor for integrator 100 is varied as required to maintain the echo time voltage from a reference reflector 170 at a constant voltage representing its fixed distance in the case of atmospheric variations, which also compensates thereby the echo time voltage of the echo from the work piece 108.

Amplifier 142 amplifies the difference between the instantaneous voltage from integrator 100 and a preset voltage from voltage divider 141. Comparator amplifier 149 switches high sooner than comparator 115 as determined by voltage divider 150. Gate 151 is high only during the time interval between the switching high of comparator 149 and 115. Gate 151 turns on analog gate 152 which passes only the echo signal from the reference reflector 170. Sample and hold 143 records the instantaneous voltage from amplifier 142 when the reference echo signal is received and provides this voltage as a minus reference to the integrator. Inverting unity gain amplifier 144 provides a corresponding plus reference to the integrator. When hysteresis amplifier 101 is high, analog gate 145 is turned on and the plus reference is provided to the resistor of the integrator 100 which thereby ramps down until hysteresis switch 101 switches low which then via inverter 146 turns on analog gate 147 which supplies the minus reference to integrator 100 causing it to ramp up, etc. This causes the integrator to home in on a fixed instantaneous voltage at the time the reference echo is received. The distance to the work piece is thereby represented as a voltage with respect to the distance to the reference reflector.

The work piece echo amplifier 148 is provided with adjustable gain, controlled by the AGC voltage from the echo strength output from amplifier 124 which has sufficient gain to maintain the echo signal voltage peak at a sufficiently constant level. The echo signal is fed to a delay line 155 with multiple taps to provide instantaneous samples of the echo signal wave shape versus time. Programming potentiometers 156 are preset to provide a close match between the voltage from the potentiometers and the preferred instantaneous voltages from the delay line 155. Voltage divider 157 provides a small voltage difference between the inputs to comparator 158 and 159 which is slightly larger than the inevitable thermal noise of the amplifier 110. Exclusive-nor 160 determines when the outputs from comparators 158 and 159 are different, i.e. when the instantaneous voltage from the delay line 155 is between the reference inputs to comparator 158 and 159. Resistors 161 sum the instantaneous coincidence of the echo wave shape and the references 156. Voltage divider 162 sets a reasonable level of coincidence requirement. Comparator 163 thereby provides a pulse to the sample and hold 123 at the moment of sufficient coincidence. It should be obvious to those skilled in the art that the delay line 155 and comparators 158 and 159 can be replaced with an analog to digital converter, a shift register for each bit, the exclusive-nors used for a comparator, and a digital memory for a reference which could be caused to remember the instantaneous echo wave form from some previous echo under ideal conditions of a work piece.

I claim:

1. A work sensing probe that senses the locus of work to be performed, including the loci of a continuum of such work, without physically contacting the work, comprising means for generating a sudden pressure wave from the work,
   means for receiving the reflection of a sudden pressure wave,
   means for limiting the spread of the pressure wave,
   means for limiting the angle of sensitivity of the receiver,
   means for recognizing the influence of the work on the reflected sudden pressure wave,
   and means for translating the recognized influence into an electric signal within the control system.

2. The invention of claim 1, in which the said electric signal directs a manipulator to position a tool to the sensed locus of the work.

3. The invention of claim 1, in which the said electric signal provides recognition of a part of a work.

4. The invention of claim 1, in which the said electric signal indicates a dimension of a work.

5. The invention of claim 1, in which the said electric signal indicates the location of a work.

6. The invention of claim 1, in which the said means for generating a sudden pressure wave employs a piezo electric component.

7. The invention of claim 1, in which the said means for generating a sudden pressure wave employs an electric spark.

8. The invention of claim 1, in which the said means for generating a sudden pressure wave employs a magnetic transducer.

9. The invention of claim 1, in which the said means for receiving the reflection of a sudden pressure wave employs a piezo electric component.

10. The invention of claim 1, in which the said means for receiving the reflection of a sudden pressure wave employs a magnetic transducer.

11. The invention of claim 6, in which the said means for generating the sudden pressure wave employs a piezo bender.

12. The invention of claim 9, in which the said means for receiving the reflection of a sudden pressure wave employs a piezo bender.

13. The invention of claim 1, in which the said influence recognized is echo time.

14. The invention of claim 1, in which the said influence recognized is echo strength.

15. The invention of claim 1, in which the said influence recognized is echo wave shape.

16. The invention of claim 1, in which multiple echos are recognized from each transmitted pressure wave.

17. The invention of claim 1, in which the said generating and receiving means are combined as a transceiver.

18. The invention of claim 1, in which the recognition means includes step-recognizer means for noting the pressure immediately before and after the sudden pressure rise of the sudden pressure wave to provide a threshold voltage intermediately of the noted pressure values, and voltage comparator means responsive to said threshold voltage.

19. The invention of claim 1, in which the recognition means includes means for comparing the echo strength with a preselected reference standard.

20. The invention of claim 1, in which the recognition means includes means for comparing the echo wave shape with a preselected reference standard.

21. The invention of claim 20, in which the comparing means is used to recognize a part of the work.

22. The invention of claim 1, in which the said translating means includes a time-to-voltage translator that converts the time between the sudden pressure wave generation and the reception of its reflection into a voltage value.

23. The invention of claim 1, in which the said translating means includes an echo strength to voltage translator that converts the received pressure just after the sudden rise of the pressure wave into a voltage value.

24. The invention of claim 20, in which the comparing means provides a signal to the control system.

25. The invention of claim 24, in which the signal to the control system is proportional to the degree of matching of the echo wave shape with the preselected reference standard.

26. The invention of claim 20, in which the preselected reference standard is a recording in a memory of a previous echo wave shape.

27. The invention of claim 22, in which the voltage value represents distance.

28. The invention of claim 23, in which the voltage value represents the area of a part of the work.

29. The invention of claim 23, in which the voltage value represents the texture of a part of the work.

30. The invention of claim 23, in which the voltage value represents the edge of a part of the work.

31. The invention of claim 23, in which the voltage value represents the angle of a part of the work piece with respect to the probe.

32. The invention of claim 1, in which the means for limiting the spread of the pressure wave is a multi apertured acoustic lens.

33. The invention of claim 1, in which the probe is scanned over the work in a line and the electric signal thereby provides information along that line.

34. The invention of claim 33, in which the work is moved in a scanning manner.

35. The invention of claim 1, in which the probe is scanned over the work in a raster pattern.

36. The invention of claim 35, in which the work is moved in a scanning manner.

37. The invention of claim 1, in which the said sudden pressure wave is a shock wave.

38. The invention of claim 1, in which the said means for limiting the angle of sensitivity of the receiver is a multi apertured acoustic lens.

39. The invention of claim 1, including a statically inert mass for mounting the piezo-bender disc at its center, said mass having annular clearance spaces for the disc freely to move in response to impressed voltage, a radiating surface activated by the disc to generate sudden pressure waves in the ambient atmosphere, and means for damping and absorbing residual and extraneous vibrations that are not components of a generated sudden pressure wave.

40. The invention of claim 1, in which the said means for translation includes compensation for changes in the ambient air temperature.

41. The invention of claim 1, in which the said means for translation includes compensation for changes in the ambient air density.

42. The invention of claim 1, in which the said means for translation includes compensation for changes in the ambient air pressure.

43. The invention of claim 1, in which the said means for translation includes compensation for changes in the ambient air humidity.

44. The invention of claim 1, in which the probe has a reflecting surface positioned so as not to interfere with the sudden pressure wave traveling to and from the work and which provides the translation means with a fixed reference standard for automatic compensation for atmospheric variations.

45. The invention of claim 1, in which the said recognizing means includes a comparison of the received wave shape with a predetermined standard.

46. The invention of claim 45, in which the predetermined standard is a recording of a previously received reflection.

47. The method of controlling a robot that includes, generating a sudden pressure wave, focusing the sudden pressure wave through a multi apertured lens toward a work target, so as to reflect an echo of the sudden pressure wave therefrom, receiving said echo, and comparing said echo with a standard to derive information of matching or differential characteristics, translating said information into an electrical signal, and applying said signal to the controls of the robot.

48. The invention of claim 47, in which the electrical signal is applied to a separate control system and the probe is positioned with a robot.

49. The invention of claim 39, in which the disc generates sudden pressure waves that propagate in an ambient liquid.

50. The invention of claim 39, in which the disc generates sudden pressure waves that propagate in an ambient solid.

* * * * *

REEXAMINATION CERTIFICATE (1097th)
United States Patent [19]
Griebeler

[11] B1 4,459,526
[45] Certificate Issued Jul. 11, 1989

[54] MULTI APERTURED LENS SHOCK WAVE PROBE

[75] Inventor: Elmer L. Griebeler, West Bloomfield, Mich.

[73] Assignee: Cleveland Machine Controls, Inc., Valley View, Calif.

Reexamination Request:
No. 90/001,520, May 25, 1988

Reexamination Certificate for:
Patent No.: 4,459,526
Issued: Jul. 10, 1984
Appl. No.: 335,331
Filed: Dec. 29, 1981

Related U.S. Application Data

[63] Continuation-in-part of Ser. No. 155,944, Jun. 3, 1980, Pat. No. 4,326,155.

[51] Int. Cl.⁴ .............................................. G05B 19/36
[52] U.S. Cl. ..................................... 318/576; 318/645; 73/587; 367/906
[58] Field of Search ............... 318/576, 645, 640, 577, 318/638; 367/127, 160, 906; 73/587, 597, 602, 620; 219/69 G, 69 E, 69 V

[56] References Cited
U.S. PATENT DOCUMENTS 2,434,143 1/1948 Chilowsky .
2,743,429 4/1958 Erdman .
3,171,012 2/1965 Morehead .
3,373,251 3/1968 Seller .
3,389,372 6/1968 Halliday et al. .
3,497,731 2/1970 Straube .
3,651,689 3/1972 Haddad .
3,775,592 10/1973 Ando et al. .
3,821,469 6/1974 Whetstone et al. .
3,857,080 12/1974 Cecil et al. .
3,883,956 5/1975 Zeewy et al. .
3,893,342 7/1975 Florian et al. .
3,997,757 12/1976 Cecil et al. .
4,010,346 3/1977 Cecil et al. .
4,012,588 3/1977 Davis et al. .
4,068,154 1/1978 Cecil et al. .
4,078,197 3/1978 Zeewy et al. .
4,099,110 7/1978 Zeewy et al. .
4,151,394 4/1979 Cecil .
4,166,941 9/1979 Cecil .
4,169,662 10/1979 Kaule et al. .
4,170,765 10/1979 Austin et al. .
4,241,430 12/1980 Kayem et al. .
4,361,687 3/1972 Dory .
4,419,562 12/1983 Jon .................................. 219/121.62

Primary Examiner—B. Dobeck
Attorney, Agent, or Firm—Robert V. Vickers

[57] ABSTRACT

There is disclosed a system for guiding, positioning, and measuring through robot control, a tool and a work zone relative to each other, by a noncontacting probe of at least one transceiver for generating shock waves, and for sensing their reflections, with one or more multiple apertured lenses for focusing and concentrating such shock waves and their reflections.

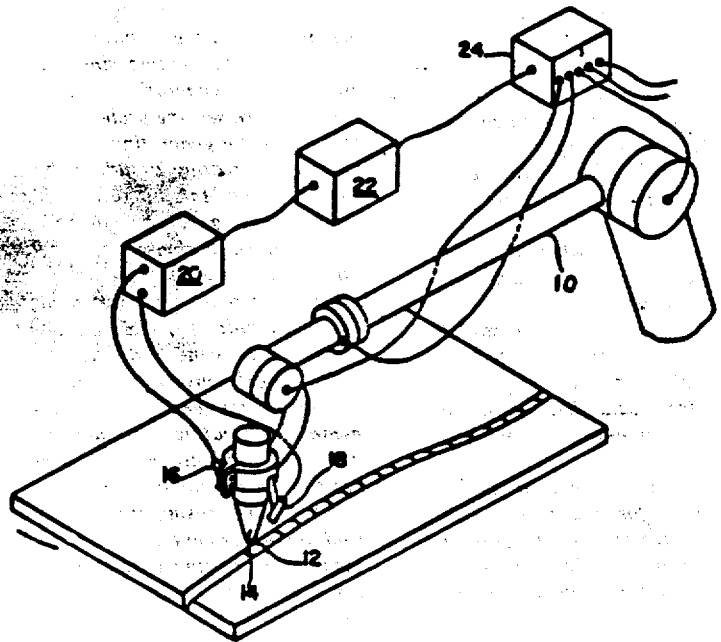

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 9:
*The prior U.S. Pat. No. 4,326,155 is explicitly incorporated by reference herein.*

AS A RESULT OF REEXAMINATION, IT HAS BEEN DETERMINED THAT:

The patentability of claims 1–50 is confirmed.

New claims 51–77 are added and determined to be patentable.

*51. A work sensing probe that senses work without physically contacting the work, comprising:*
  *(a) first transducer means for generating a sudden pressure wave;*
  *(b) means for directing said sudden pressure wave toward said work whereby said sudden pressure wave, upon engaging said work, generates a sudden pressure wave from said work in the form of an echo wave;*
  *(c) second transducer means for receiving the reflection of a sudden pressure wave;*
  *(d) said first transducer means including means for limiting the spread of the sudden pressure wave;*
  *(e) said second transducer means being a receiver and including means for limiting the angle of sensitivity of the receiver;*
  *(f) means for recognizing the influence of the work on the reflected sudden pressure wave; and,*
  *(g) means for translating the recognized influence onto an electrical signal within a control system.*

*52. A probe as defined in claim 51 wherein said generating means and receiving means are combined as a transceiver.*

*53. A probe as defined in claim 51 wherein said first transducer means includes means for creating said sudden pressure wave by an electric discharge.*

*54. A probe as defined in claim 51 wherein said first transducer means includes means for creating said sudden pressure wave by moving a surface from a first position to a second position displaced from said first position at a speed sufficiently high to create a non-cyclical compression or rarefaction wave.*

*55. A probe as defined in claim 51 wherein said first transducer means includes means for creating said sudden pressure wave by moving a surface from a first position to a second position displaced from said first position at a speed sufficiently high to create a non-cyclical compression or rarefaction wave with a very abrupt change in pressure, density and velocity.*

*56. A probe as defined in claim 51 wherein said first transducer means includes means for creating said sudden pressure wave by moving a surface from a first position to a second position displaced from said first position at a speed sufficiently high to create a non-cyclical compression or rarefaction wave with a single, steep-faced wave front.*

*57. A work sensing probe as defined in claim 1 wherein said means for generating a sudden pressure wave is a transducer having a generating surface and means for moving said generating surface at speed sufficiently high to create a non-cyclical compression wave.*

*58. A work sensing probe as defined in claim 1 wherein said means for generating a sudden pressure wave is a transducer having a generating surface and means for moving said generating surface at speed sufficiently high to create a non-cyclical rarefaction wave.*

*59. A work sensing probe as defined in claim 51 wherein said first transducer includes means for creating said sudden pressure wave by moving a surface in response to means for creating a sudden high energy input to said surface or withdrawal from said surface.*

*60. A work sensing probe as defined in claim 59 wherein said surface is a diaphragm.*

*61. A work sensing probe as defined in claim 60 wherein means for creating a sudden high energy input or withdrawal is means for suddenly imposing a high voltage across said diaphragm.*

*62. A work sensing probe as defined in claim 59 wherein said means for creating a sudden high energy input or withdrawal is means for suddenly imposing a high voltage to move said surface.*

*63. A work sensing probe as defined in claim 1 wherein said means for generating a sudden pressure wave includes means for creating a sudden high energy input or withdrawal by suddenly imposing a high voltage to said sudden pressure wave generating means.*

*64. A work sensing probe as defined in claim 13 wherein said means for generating a sudden pressure wave includes means for creating a sudden high energy input or withdrawal by suddenly imposing a high voltage to said sudden pressure wave generating means.*

*65. A work sensing probe as defined in claim 14 wherein said means for generating a sudden pressure wave includes means for creating a sudden high energy input or withdrawal by suddenly imposing a high voltage to said sudden pressure wave generating means.*

*66. A work sensing probe as defined in claim 15 wherein said means for generating a sudden pressure wave includes means for creating a sudden high energy input or withdrawal by suddenly imposing a high voltage to said sudden pressure wave generating means.*

*67. A work sensing probe as defined in claim 16 wherein said means for generating a sudden pressure wave includes means for creating a sudden high energy input or withdrawal by suddenly imposing a high voltage to said sudden pressure wave generating means.*

*68. A work sensing probe as defined in claim 17 wherein said means for generating a sudden pressure wave includes means for creating a sudden high energy input or withdrawal by suddenly imposing a high voltage to said sudden pressure wave generating means.*

*69. A work sensing probe as defined in claim 22 wherein said means for generating a sudden pressure wave includes means for creating a sudden high energy input or withdrawal by suddenly imposing a high voltage to said sudden pressure wave creating means.*

*70. A work sensing probe as defined in claim 23 wherein said means for creating a sudden pressure wave includes means for creating a sudden high energy input or with-* drawal by suddenly imposing a high voltage to said sudden pressure wave generating means.

71. A work sensing probe as defined in claim 27 wherein said means for generating a sudden pressure wave includes means for creating a sudden high energy input or withdrawal by suddenly imposing a high voltage to said sudden pressure wave generating means.

72. A work sensing probe as defined in claim 37 wherein said means for generating a sudden pressure wave includes means for creating a sudden high energy input or withdrawal by suddenly imposing a high voltage to said sudden pressure wave generating means.

73. A work sensing probe as defined in claim 40 wherein said means for generating a sudden pressure wave includes means for creating a sudden high energy input or withdrawal by suddenly imposing a high voltage to said sudden pressure wave generating means.

74. A work sensing probe as defined in claim 41 wherein said means for generating a sudden pressure wave includes means for creating a sudden high energy input or withdrawal by suddenly imposing a high voltage to said sudden pressure wave generating means.

75. A work sensing probe as defined in claim 42 wherein said means for generating a sudden pressure wave includes means for creating a sudden high energy input or withdrawal by suddenly imposing a high voltage to said sudden pressure wave generating means.

76. A work sensing probe as defined in claim 43 wherein said means for generating a sudden pressure wave includes means for creating a sudden high energy input or withdrawal by suddenly imposing a high voltage to said sudden pressure wave generating means.

77. A work sensing probe as defined in claim 44 wherein said means for generating a sudden pressure wave includes means for creating a sudden high energy input or withdrawal by suddenly imposing a high voltage to said sudden pressure wave generating means.

* * * * *

REEXAMINATION CERTIFICATE (1446th)
United States Patent [19]

Griebeler

[11] B2 4,459,526

[45] Certificate Issued Apr. 2, 1991

[54] MULTI APERTURED LENS SHOCK WAVE PROBE

[75] Inventor: Elmer L. Griebeler, West Bloomfield, Mich.

[73] Assignee: Cleveland Machine Controls, Inc., Valley View, Ohio

Reexamination Request:
No. 90/001,805, Jun. 30, 1989

Reexamination Certificate for:
Patent No.: 4,459,526
Issued: Jul. 10, 1984
Appl. No.: 335,331
Filed: Dec. 29, 1981

Reexamination Certificate B1 4,459,526 issued Jul. 11, 1989.

Related U.S. Application Data

[63] Continuation-in-part of Ser. No. 155,944, Jun. 3, 1980, Pat. No. 4,326,155.

[51] Int. Cl.$^5$ .............................................. G05B 19/36
[52] U.S. Cl. ................................. 318/576; 318/645; 73/587; 367/906
[58] Field of Search ............... 318/572, 645, 640, 576, 318/577, 638; 367/127, 160, 906; 73/587, 597, 602, 620; 219/69 G, 69 E, 69 V

[56] References Cited

U.S. PATENT DOCUMENTS 3,283,292 11/1966 Kay .
3,651,687 3/1972 Dory .
4,170,765 10/1979 Austin .

OTHER PUBLICATIONS

M. E. Thesis by W. P. Willis; "A Short Range Ultrasonic Position Detector For Automation", University of Canterbury, Christchurch, New Zealand, Feb., 1969.
*The Radio and Electronic Engineer*, vol. 40, No. 6, Dec. 1970, "An Ultrasonic Position Sensor For Automatic Control", W. P. Willis & L. Kay *Acustics*; vol. 4, No. 5, 1954, Condenser Transmitters and Microphones With Solid Dielectric For Airborne Ultrasonics, W. Kuhl, G. R. Schodder & F. K. Schroder.

*Primary Examiner*—William M. Shoop, Jr.

[57] ABSTRACT

There is disclosed a system for guiding, positioning, and measuring through robot control, a tool and a work zone relative to each other, by a noncontacting probe of at least one transceiver for generating shock waves, and for sensing their reflections, with one or more multiple apertured lenses for focusing and concentrating such shock waves and their reflections.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-77 is confirmed.

* * * * *